(12) United States Patent
Imoto et al.

(10) Patent No.: US 6,482,277 B2
(45) Date of Patent: Nov. 19, 2002

(54) METHOD OF MANUFACTURING HYDROGEN-ABSORBING ALLOY ELECTRODE

(75) Inventors: Teruhiko Imoto, Itano-gun (JP); Tadashi Ise, Itano-gun (JP); Yohei Hirota, Itano-gun (JP); Takayuki Murakami, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/810,464

(22) Filed: Mar. 19, 2001

(65) Prior Publication Data

US 2001/0035239 A1 Nov. 1, 2001

(30) Foreign Application Priority Data

Mar. 21, 2000 (JP) ........................................ 2000-078747
Mar. 21, 2000 (JP) ........................................ 2000-078748

(51) Int. Cl.$^7$ ................................................. C21D 1/74
(52) U.S. Cl. ....................................... 148/513; 420/900
(58) Field of Search ........................... 148/513; 420/900

(56) References Cited

U.S. PATENT DOCUMENTS

| | | | | |
|---|---|---|---|---|
| 4,576,640 A | * | 3/1986 | Wootton et al. | 148/331 |
| 5,605,585 A | * | 2/1997 | Yamamoto et al. | 148/513 |
| 5,962,165 A | * | 10/1999 | Tsuruta et al. | 420/900 |
| 6,238,822 B1 | * | 5/2001 | Imoto et al. | 429/218.2 |

FOREIGN PATENT DOCUMENTS

| | | |
|---|---|---|
| EP | 0 753 590 A1 | 1/1997 |
| EP | 0 765 705 A1 | 4/1997 |
| EP | 0 837 515 A1 | 4/1998 |
| EP | 0 845 823 A1 | 6/1998 |
| JP | 5-225975 | 9/1993 |
| JP | 9-3584 | 1/1997 |
| JP | 9-237628 | 9/1997 |
| JP | 10-280112 | 10/1998 |

\* cited by examiner

*Primary Examiner*—Roy King
*Assistant Examiner*—Tima McGuthry-Banks
(74) *Attorney, Agent, or Firm*—Nixon & Vanderhye P.C.

(57) ABSTRACT

A hydrogen-absorbing alloy electrode is prepared by reducing an oxide or hydroxide residing on the surface of a hydrogen-absorbing alloy particle while the alloy particle is held in an atmosphere of a hydrogen gas maintained at a temperature where absorbing of a hydrogen gas does not substantially occur; cooling the atmosphere from a temperature where absorbing of the hydrogen gas does not substantially occur to a temperature where the equilibrium hydrogen pressure of the hyrogen-absorbing alloy is equal to the hydrogen pressure in the atmosphere of the hydrogen gas and thereafter vacuum-evacuating and removing the hydrogen gas so that the hydrogen-absorbing alloy particle is cooled to room temperature while the hydrogen gas is exhausted; and thereafter introducing argon, nitrogen or carbon dioxide gas into the atmosphere, thereby returning the atmosphere to normal atmospheric pressure; and immersing the hydrogen-absorbing alloy particle so prepared in a solution containing an oxidation inhibiting agent.

23 Claims, 2 Drawing Sheets

METHOD OF MANUFACTURING HYDROGEN-ABSORBING ALLOY ELECTRODE

BACKGROUND OF THE INVENTION

1. Field of the Invention

This invention relates to a hydrogen-absorbing alloy electrode capable of reversibly carrying out the electrochemical charge/discharge of a hydrogen gas which is used as a negative electrode of an nickel-metal hydride battery, and more particularly to surface-treatment of the hydrogen-absorbing alloy particle containing a rare-earth element and nickel.

2. Description of the Related Art

In recent years, in order to realize the alkaline storage battery with high energy density, the nickel-metal hydride battery equipped with a hydrogen-absorbing alloy electrode has been put into practice. Previously known hydrogen-absorbing alloys which can be used for the nickel-metal hydride battery are Ti—Ni alloy, La (or Mm)—Ni alloy, etc.

The hydrogen-absorbing alloy used in the hydrogen-absorbing alloy electrode is ground alloy which is obtained by grinding an alloy ingot, flake or spherical particle mechanically and electrochemically, or spherical or similar shape (elliptical) particle which is made by an atomization, a rotary disk method, a rotary nozzle method, etc. Meanwhile, the surface of the hydrogen-absorbing alloy particle is very active. Therefore, when it is exposed to air atmosphere just a little, it immediately reacts with oxygen in the air. As a result, the alloy surface is oxidized to form an oxide layer. The oxide layer attenuates the surface activity of the alloy, and particularly gives rise to reduction of the initial discharging capacity of the battery. Therefore, after the battery has been assembled, it must be subjected to charging/discharging several cycles to several tens cycles to remove the oxide layer and activate the particle surface, thereby realizing the desired discharging capacity. This required very great labor and time.

In order to obviate such inconvenience, a technique for removing an oxide layer on the surface of the hydrogen-absorbing alloy particle has been proposed in JP-A-5-225975 which discloses an acidic treating method of immersing the hydrogen-absorbing alloy particle in hydrochloric acid (HCl).

The acidic treating method proposed by JP-A-5-225975 was efficient to remove the layer of the rare-earth metal oxide of the oxide layer on the surface of the hydrogen-absorbing alloy particle, but not so efficient to remove nickel oxide or nickel hydroxide, thus presenting a problem that the nickel hydroxide is newly created.

Further, by the acidic treatment using hydrochloric acid, chloride ions were left on the surface of the hydrogen-absorbing alloy particle so that rinsing treatment must be made to remove the chloride ions after the acidic treatment. During the rinsing treatment, an inconvenience that the activated surface of the hydrogen-absorbing alloy is oxidized again by oxygen in water was presented.

In order to obviate such inconvenience, a surface treatment of a hydrogen absorbing alloy particle in an atmosphere of a hydrogen gas maintained at high temperature was proposed by JP-A-9-237628 in which before preparing a hydrogen-absorbing alloy electrode, the hydrogen-absorbing alloy particle containing nickel with a nickel oxide or nickel hydroxide is held for a suitable time in an atmosphere of a hydrogen gas (also referred to as hydrogen gas atmosphere) maintained at a temperature where absorbing of the hydrogen gas does not substantially occur so that the layer on the hydrogen-absorbing alloy particle is reduced by the hydrogen gas to expose the nickel activated surface onto the surface of the hydrogen-absorbing alloy particle.

In the hydrogen gas reduction treatment technique for the nickel-containing hydrogen-absorbing alloy proposed by JP-A-9-237628, before the hydrogen gas reduction treatment, the alloy is previously subjected to alkaline treatment to remove the oxide on the surface of the hydrogen-absorbing alloy particle, or previously subjected to acidic treatment to generate a layer of nickel oxide or nickel hydroxide so that the quantity of nickel to be reduced by the hydrogen gas reduction treatment is increased.

However, since the acidic treatment or alkaline treatment which is carried out before the hydrogen reduction treatment belong to a wet type, the nickel-containing hydrogen-absorbing alloy particle must be dried before it is subjected to the hydrogen gas reduction treatment. This presented a problem of making the manufacturing process complicate and increasing the treatment time.

When the nickel-containing hydrogen-absorbing alloy particle is dried before it is subjected to the hydrogen gas reduction treatment, a problem occurred that a part of the surface of the hydrogen-absorbing alloy particle is oxidized during drying so that rare-earth oxide or nickel oxide is formed. In this case, another problem occurred that the nickel oxide of the oxides thus formed can be reduced by the hydrogen gas reduction treatment, but the rare-earth oxide cannot be reduced so that the porosity of the surface of the hydrogen-absorbing alloy particle is decreased, thus attenuating the battery capacity.

Still another problem occurred that where the activated surface of nickel is exposed to the particle surface of the hydrogen-absorbing alloy particle, if the activated surface is exposed to air again, it is oxidized again so that it is difficult to maintain the activity.

A further problem occurred that the since the surface of the hydrogen-absorbing alloy particle is activated greatly by the hydrogen gas reduction treatment, the hydrogen-absorbing alloy particle thus treated must be held in water so that the active surface is lost.

SUMMARY OF THE INVENTION

This invention has been accomplished to solve the problems described above, and aims at providing a treatment method which can maintain the activity of the surface of a hydrogen-absorbing alloy particle is activated by hydrogen gas reduction treatment, thereby obtaining a hydrogen-absorbing alloy electrode with an excellent discharging capacity.

In order to attain the above object, the method of manufacturing a hydrogen-absorbing alloy electrode according to this invention comprises:

a step of holding a hydrogen-absorbing alloy particle in an atmosphere of a hydrogen gas maintained at a temperature where absorbing of the hydrogen gas does not substantially occur;

a step of naturally cooling the atmosphere from the temperature where absorbing of the hydrogen gas does not substantially occur to the temperature where the equilibrium hydrogen pressure of the hydrogen-absorbing alloy is equal to the hydrogen pressure in the atmosphere of the hydrogen gas and thereafter vacuum-evacuating the atmosphere of the hydrogen gas so that the hydrogen-absorbing alloy particle is cooled to room temperature while the hydrogen gas is exhausted;

a step of exhausting the hydrogen gas and cooling the atmosphere to room temperature and thereafter introducing at least one kind of gas selected from the group consisting of argon, nitrogen and carbon dioxide into the atmosphere, thereby returning the atmosphere to normal atmospheric pressure; and a step of immersing the hydrogen-absorbing alloy particle thus acquired in solution containing an oxidation inhibiting agent.

Preferably, said step of holding comprises a step of reducing an oxide or hydroxide residing on the surface of a hydrogen-absorbing alloy particle while the alloy particle is held in an atmosphere of a hydrogen gas maintained at a temperature where absorbing of the hydrogen gas does not substantially occur.

In the case thwhereat the hydrogen-absorbing alloy is pressurized by hydrogen at a prescribed temperature, a metallic phase with the hydrogen solid-solved ($\alpha$ phase) is first created. When the pressure is further raised, the hydrogen generates a hydroxide ($\beta$ phase) where the hydrogen occupies the site of a metallic lattice. At this time, there is a region where the a phase and the $\beta$ phase exist commonly, which is referred to as a plateau region. At a high temperature, the pressure of generating the plateau region (plateau pressure) is raised so that the hydroxide cannot be generated. In this state also, it should be noted that the solid-solved state of the hydrogen has occurred so that a little hydrogen exists in the $\alpha$ phase.

Therefore, no occurrence of the substantial absorbing of hydrogen means the absorbing of only the hydrogen in the solid-solved state in the a phase. In this state, the amount of the occluded hydrogen is much less than that in the region of creating the hydroxide (co-existing region of the $\alpha$ phase and the $\beta$ phase) so that the hydrogen is not substantially charged. If the alloy-absorbing alloy is held in an atmosphere of the hydrogen gas which is lower than the temperature where the hydrogen gas is not substantially absorbed, the hydrogen gas does not contribute to reduction of the oxide or hydroxide on the surface of the alloy particle, but is internally absorbed in the hydrogen alloy particle from its surface.

When the temperature of the atmosphere of the hydrogen gas rises, the equilibrium hydrogen pressure of the hydrogen-absorbing alloy also rises so that hydrogen absorbing does not occur. The hydrogen gas in the atmosphere acts on the layer of the oxide residing in the particle surface so that the oxide on the surface of the hydrogen-absorbing alloy particle is reduced into the metallic state.

In this way, the hydrogen gas reduction to the hydrogen-absorbing alloy particle can reduce the layer of the nickel oxide, nickel hydroxide, cobalt oxide or cobalt hydroxide formed on the surface of the hydrogen-absorbing alloy particle into its metallic state of the nickel or cobalt. This enhances the surface activity of the hydrogen-absorbing alloy particle. Therefore, the hydrogen-absorbing alloy electrode made from the hydrogen-absorbing alloy particle subjected to the above reduction is excellent in the activity and high in the initial discharging capacity. Accordingly, the number of times of the charging/discharging carried out for the battery incorporating the hydrogen-absorbing alloy electrode can be reduced.

However, when the hydrogen-absorbing alloy particle with the surface activity improved is exposed to the air, it is oxidized again so that its activity is difficult to maintain. In order to obviate such inconvenience, in accordance with this invention, the surface of the hydrogen-absorbing alloy particle is caused to adsorb the gas such as argon, nitrogen or carbon dioxide, or otherwise the hydrogen-absorbing alloy particle is immersed in the solution containing the oxidation inhibiting agent so that the surface of the hydrogen-absorbing alloy particle is not directly exposed to the air. Thus, even when the surface of the hydrogen-absorbing alloy particle is exposed to the air, it is prevented from being oxidized again, thereby maintaining the surface activity.

Meanwhile, in order to introduce the gas such as argon, nitrogen or carbon dioxide into the atmosphere, the atmosphere of the hydrogen gas must be vacuum-evacuated to exhaust the hydrogen gas. However, if the temperature of the atmosphere is lowered during exhaustion of the hydrogen gas, the hydrogen-absorbing alloy will adsorb the hydrogen gas. In order to obviate such inconvenience, in accordance with this invention, the atmosphere is naturally cooled from the temperature where absorbing of the hydrogen gas does not substantially occur to the temperature where the equilibrium hydrogen pressure of the hydrogen-absorbing alloy is equal to the hydrogen pressure in the atmosphere of the hydrogen gas and thereafter vacuum-evacuation of the atmosphere of the hydrogen gas is started so that the atmosphere is cooled to room temperature while the hydrogen gas is exhausted.

When the equilibrium hydrogen pressure of the hydrogen-absorbing alloy becomes equal to the hydrogen pressure in the atmosphere of the hydrogen gas, the hydrogen-absorbing alloy starts to charge the hydrogen. If the vacuum-evacuation is started at this time to exhaust the hydrogen gas, since the hydrogen pressure in the hydrogen gas atmosphere falls, the charged hydrogen will be desorbed. Thus, the absorbing/desorbing of hydrogen is made the moment the vacuum-evacuation is started. As a result, minute-cracks are formed on the surface of the hydrogen-absorbing alloy particle so that the surface area of the hydrogen-absorbing alloy particle is also increased.

Thereafter, even if the atmosphere is vacuum-evacuated so that its temperature is cooled to room temperature, the hydrogen does not remain in the atmosphere so that the hydrogen-absorbing alloy particle does not charge the hydrogen gas. When the gas such as argon, nitrogen or carbon dioxide is introduced in the atmosphere at a normal temperature (25° C.), the gas such as argon, nitrogen or carbon dioxide is adsorbed on the surface of the hydrogen-absorbing alloy particle.

Since the gas such as argon, nitrogen, carbon dioxide adsorbed on the hydrogen-absorbing alloy particle is removed by the alkaline electrolyte in the battery, it does not exert an adverse effect on the battery. Since the active surface is exposed within the battery, the initial discharging capacity of the battery is improved greatly. Further, when the hydrogen-absorbing alloy particle with the gas such as argon, nitrogen, carbon dioxide, etc. is immersed in the solution containing the oxidation inhibiting agent, the oxidation inhibiting agent is selectively adsorbed on the surface of the hydrogen-absorbing alloy particle so that the creation of the oxide or hydroxide is inhibited, thereby maintaining the surface activity.

In this case, the oxidation inhibiting agent preferably contains at least one kind of acid selected from the group consisting of phosphate, silicate, hypophosphite and tetrahydro borate. The adding amount of the oxidation inhibiting agent is preferably $1.0 \times 10^{-6}$ by mass % ~$5.0 \times 10^{-1}$ by mass % to the mass of the alloy. Further, if the oxygen exhausting step of vacuum-evacuating an atmosphere so that oxygen in the atmosphere is exhausted is done prior to the hydrogen gas reduction step, the surface of the hydrogen-absorbing alloy particle is prevented from being oxidized during the hydrogen gas reduction step.

Incidentally, the upper limit of the temperature range in the hydrogen gas atmosphere is preferably the temperature where the texture of the hydrogen-absorbing alloy is not subjected to the diffusion effect by heat. This is because if the texture of the hydrogen-absorbing alloy is disordered under the influence of heat, the activity of the hydrogen-absorbing alloy itself is attenuated. The temperature of the hydrogen gas atmosphere, which varies according to the kind of the hydrogen-absorbing alloy, about 100° C.~500° C. in order to treat the $MmNi_{3.1}Co_{0.9}Al_{0.4}Mn_{0.6}$. which will be described later Further in order to attain the above object, method of manufacturing a hydrogen-absorbing alloy electrode according to this invention comprises:

a step of holding a hydrogen-absorbing alloy particle in an atmosphere of a hydrogen gas maintained at a temperature where absorbing of the hydrogen gas does not substantially occur;

a step of vacuum-evacuating the atmosphere of the hydrogen gas to exhaust the hydrogen gas; and an adosorption step of cooling the atmosphere with the hydrogen gas exhausted and thereafter introducing an adsorption gas into the atmosphere so that the adsorption gas is adsorbed on the surface of the hydrogen-absorbing alloy particle.

Preferably, said step of holding comprises a step of reducing an oxide or hydroxide residing on the surface of a hydrogen-absorbing alloy particle while the alloy particle is held in an atmosphere of a hydrogen gas maintained at a temperature where absorbing of the hydrogen gas does not substantially occur. Meanwhile, if the temperature of the atmosphere is lowered during exhaustion of the hydrogen gas by evacuation of the atmosphere of the hydrogen gas, the hydrogen-absorbing alloy will adsorb the hydrogen gas. Therefore, in a state maintained at the temperature where absorbing of the hydrogen gas does not occur, the atmosphere of the hydrogen gas must be evacuated to exhaust the hydrogen gas. Even when the atmosphere is cooled to room temperature, since the hydrogen does not remain in the atmosphere, the hydrogen-absorbing alloy will not charge the hydrogen gas. When the adsorption gas such as carbon dioxide or nitrogen is introduced into the atmosphere in the state at a normal temperature (about 25° C.), it will be adsorbed on the surface of the hydrogen-absorbing alloy particle.

Since the adsorption gas such as carbon dioxide or nitrogen adsorbed on the hydrogen-absorbing alloy particle is removed by the alkaline electrolyte in the battery, it does not exert an adverse effect on the battery. Since the active surface is exposed within the battery, the initial discharging capacity of the battery is improved greatly. Further, since the state where the oxide or hydroxide residing on the particle surface of the hydrogen-absorbing alloy has been reduced into the metallic state is maintained, the oxygen density within the hydrogen-absorbing alloy immediately after the battery has been manufactured decreases. Thus, corrosion/oxidation by the electrolyte within the battery and the oxidation by the oxygen generated from the positive electrode are retarded, thereby also improving the cycle characteristic.

Further, the method of manufacturing a hydrogen-absorbing alloy electrode according to this invention, comprises:

a hydrogen gas reduction step of reducing an oxide or hydroxide residing on the surface of a hydrogen-absorbing alloy particle while the alloy particle is held in an atmosphere of a hydrogen gas maintained at a temperature where absorbing of the hydrogen gas does not substantially occur;

a step of vacuum-evacuating the atmosphere of the hydrogen gas to exhaust the hydrogen gas; and a step of cooling the atmosphere with the hydrogen gas exhausted to room temperature and thereafter introducing an argon gas or nitrogen gas into the atmosphere so that the pressure of the atmosphere is returned to normal pressure; and a step of immersing the hydrogen-absorbing alloy particle thus acquired in a solution containing an oxidation inhibiting agent.

In this way, the hydrogen gas reduction treatment is performed to activate the surface of the hydrogen; the atmosphere of the hydrogen gas maintained at the temperature where absorbing of the hydrogen gas does not occur is vacuum-evacuated, thereby exhausting the argon gas; the argon gas or nitrogen gas is introduced to restore the pressure of the atmosphere to normal pressure; and the atmosphere is cooled to room temperature and thereafter the hydrogen-absorbing alloy particle is immersed in the solution. Thus, the oxidation inhibiting agent is selectively adsorbed on the surface of the hydrogen-absorbing alloy particle so that the creation of the oxide or hydroxide can be suppressed to maintain the activity.

In this case, the oxidation inhibiting agent preferably contains at least one kind of acid selected from the group consisting of phosphate, silicate, hypophosphite and tetrahydro borate. Where the hydrogen-absorbing alloy particle is immersed in the oxidation inhibiting agent, the alloy particle has preferably a smaller average particle diameter. This is because the alloy particle has a larger surface area as the average particle diameter decreases, and hence oxidized at a greater degree of oxidation. Further, if the oxidation/exhaustion step in which the atmosphere is vacuum-evacuated to exhaust the oxygen in the atmosphere is executed prior to the hydrogen gas reduction treatment step, it is possible to prevent the surface of the hydrogen-absorbing alloy particle from being oxidized during the hydrogen reduction treatment.

The temperature of the atmosphere of the hydrogen gas is set at a temperature not lower than the temperature where the hydrogen-absorbing alloy does not substantially charge the hydrogen gas. This is because when the hydrogen-absorbing alloy is held in the atmosphere of the hydrogen gas at a lower temperature than this temperature, the hydrogen gas does not contribute to the reduction of the oxide or hydroxide on the surface of the hydrogen-absorbing alloy particle, but is internally absorbed into the hydrogen-absorbing alloy particle from its surface.

When the temperature of the atmosphere of the hydrogen gas rises, the equilibrium hydrogen pressure of the hydrogen-absorbing alloy also rises so that hydrogen absorption of the hydrogen-absorbing alloy does not occur. The hydrogen gas in the atmosphere acts on the layer of the oxide residing on the particle surface of the hydrogen-absorbing alloy so that the nickel oxide and others on the surface of the hydrogen-absorbing alloy particle is reduced into the metallic state of nickel.

In order to prevent an impurity gas from being mixed into the hydrogen atmosphere from the treatment atmosphere, the pressure of the hydrogen gas atmosphere must be higher than the atmospheric pressure. Generally, it is preferably 1

Mpa (about 10 atm) exceeding the atmospheric pressure. It is more preferably 0.11~0.51 MPa (about 1.1~5 atm). The hydrogen-absorbing alloy is held for a sufficiently long time enough to reduce the layer of the nickel oxide or nickel hydroxide on the hydrogen-absorbing alloy completely. Concretely, it is preferably 0.5 hour or longer although it changes according to the treated amount of the hydrogen-absorbing alloy particle and other conditions.

Figure 1:
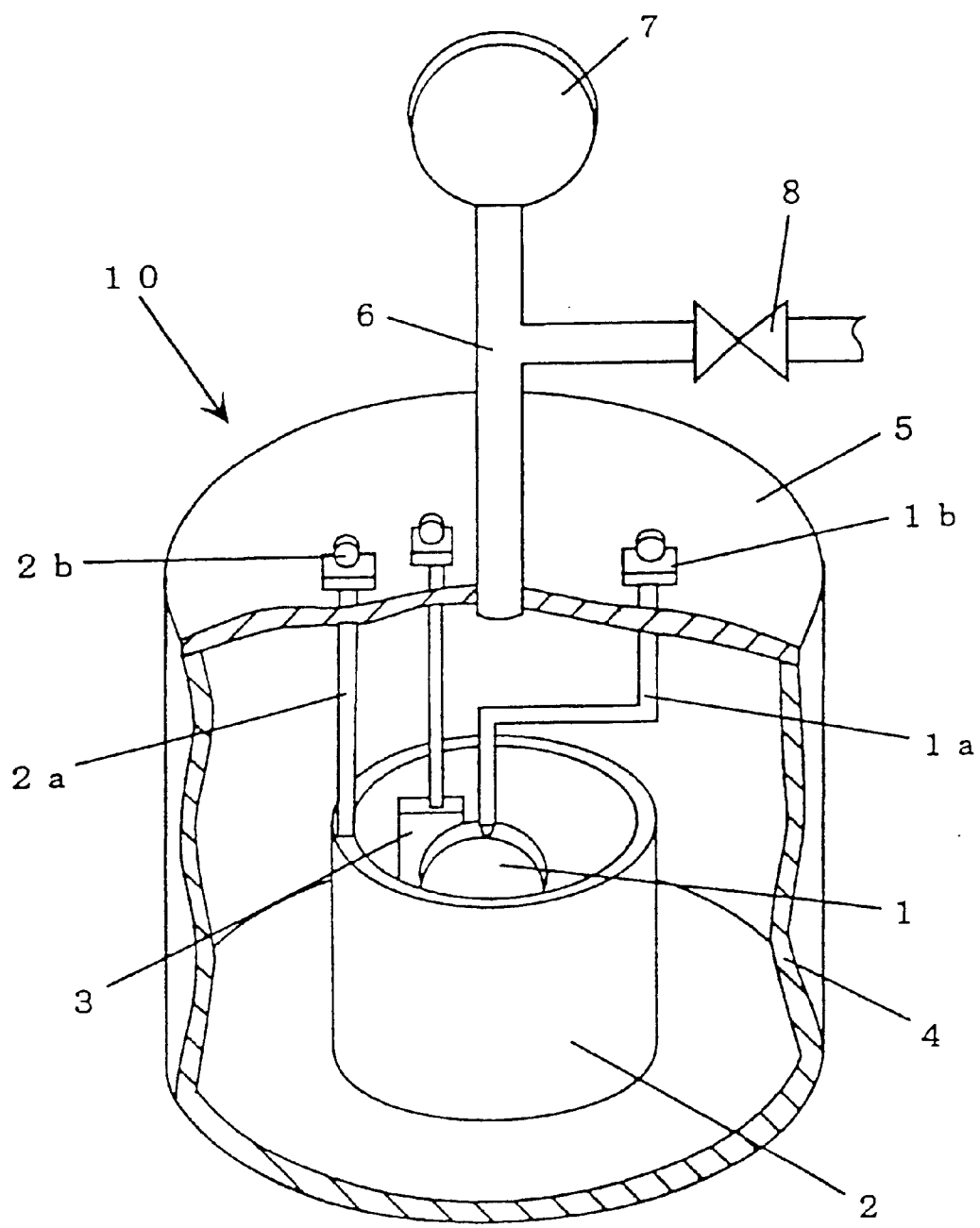
FIG. 1 is a partially-exploded perspective view showing a testing cell manufactured using the testing cell of the hydrogen-absorbing alloy according to this invention.

1 . . . negative electrode, 1$a$ . . . negative lead, 1$b$ negative terminal, 2 . . . positive electrode, 2$a$ . . . positive lead, 2$b$ . . . positive terminal, 3 . . . reference electrode, 4 . . . vessel, 5 . . . upper cover, 6 . . . relief tube, 7 . . . pressure meter, 8 . . . relief valve, 10 . . . testing cell, 11 . . . positive electrode, 11$a$ . . . positive lead, 12 . . . negative lead, 12$a$ . . . negative lead, 13 . . . separator, 14 . . . negative electrode case, 15 . . . sealing cover, 16 . . . packing, 17 . . . coil spring, 18 . . . positive external terminal, 20 . . . alkaline battery

DESCRIPTION OF THE PREFERRED EMBODIMENTS

An explanation will be given of a first embodiment of this invention in which the hydrogen-absorbing alloy electrode according to this invention is applied to a nickel-metal hydride battery.

1. Creation of Hydrogen-absorbing Alloy Particle
(1) Preparation of the Hydrogen-absorbing Alloy Particle The elements of Mm (mischmetal), Ni (purity of 99.9%), Co, Al and Mn which are commercially available are mixed at a mol rate of 1.0:3.1:0.9:0.4:0.6. Thereafter, these elements were cast and dissolved in a high frequency melting furnace, and cooled on a water-cooled copper roll to prepare an ingot of an hydrogen-absorbing alloy having a composition represented by a composition formulas of $MmNi_{3.1}$, $Co_{0.9}Al_{0.4}Mn_{0.6}$. After the ingot of this hydrogen-absorbing alloy has been heat-treated, it was cast into aball mill so that it was crushed to provide the crushed alloy particle having an average diameter of 80 $\mu$m. The crushed alloy particle is referred to as alloy particle z.

(2). Surface-treatment of the Hydrogen-absorbing Alloy Particle

EXAMPLE 1

A heat-resistant pressure-resistant vessel of stainless steel is filled with the particle z of the hydrogen-absorbing alloy thus prepared, and the atmosphere is heated to 300° C. while it is evacuated to $1.33\times10^{-2}$ Pa($10^{-4}$ Torr) or less. The hydrogen-absorbing alloy particle z is subjected to a hydrogen gas reduction treatment in which a hydrogen gas at 0.2 MPa (2 atm) is introduced into the vessel maintained at 300° C. and maintained for 0.5 hour as it is. Thus, oxide or hydroxide of Ni (nickel) and Co (cobalt) which resides on the surface of the hydrogen-absorbing alloy particle z was reduced so that the active surface of Ni and Co is exposed to the surface of the hydrogen-absorbing alloy particle.

The atmosphere was naturally cooled at a temperature where the hydrogen-absorbing alloy start to charge the hydrogen, i.e. the equilibrium hydrogen pressure of the hydrogen-absorbing alloy and that of the hydrogen gas atmosphere becomes equal to each other. Thereafter, a vacuum pump is operated to evacuate the atmosphere until the interior of vessel is placed at $1.33\times10^{-2}$ Pa($10^{-4}$ Torr) or lower so that the hydrogen gas within the vessel is exhausted while the atmosphere within the vessel is cooled to room temperature (25° C.). Subsequently, an argon (Ar) gas was introduced into the vessel until its pressure reaches an atmospheric pressure. The hydrogen-absorbing alloy particle thus argon-treated was taken out and was subjected to oxidation inhibiting agent treatment in which it is immersed for ten days in a solution of disodium hydrogenphosphate ($Na_2HPO_4$: oxidation inhibiting agent) of 1.0×10–1 by mass % added to the mass of the alloy). The hydrogen-absorbing alloy thus subjected to the oxidation inhibiting agent was referred to as the alloy particle a according to the first example.

EXAMPLE 2

Like the first example, the hydrogen-absorbing alloy particle z prepared as described above was subjected to the hydrogen gas reduction treatment and the argon gas treatment. Further, unlike the first example, the alloy particle was subjected to oxidation inhibiting agent treatment in which it is immersed for ten days in a solution of potassium silicate ($K_2O.SiO_2$:oxidation inhibiting agent) of $1.0\times10^{-1}$ by mass % added to the mass of the alloy). The hydrogen-absorbing alloy thus subjected to the oxidation inhibiting agent was referred to as the alloy particle b according to the second example.

EXAMPLE 3

Like the first example, the hydrogen-absorbing alloy particle z prepared as described above was subjected to the hydrogen gas reduction treatment and the argon gas treatment. Further, unlike the first example, the alloy particle was subjected to oxidation inhibiting agent treatment in which it is immersed for ten days in a solution of sodium hydrophophite (oxidation inhibiting agent) of 1.0×10–1 by mass % added to the mass of the alloy). The hydrogen-absorbing alloy thus subjected to the oxidation inhibiting agent was referred to as the alloy particle c according to the third example.

EXAMPLE 4

Like the first example, the hydrogen-absorbing alloy particle z prepared as described above was subjected to the hydrogen gas reduction treatment and the argon gas treatment. Further, unlike the first example, the alloy particle was subjected to oxidation inhibiting agent treatment in which it is immersed for ten days in a solution of tetrahydro sodium borate (oxidation inhibiting agent) of $1.0\times10^{-1}$ by mass % added to the mass of the alloy). The hydrogen-absorbing alloy thus subjected to the oxidation inhibiting agent was referred to as the alloy particle d according to the fourth example.

EXAMPLE 5

Like the first example, the hydrogen-absorbing alloy particle z prepared as described above was subjected to the hydrogen gas reduction treatment and exhaustion of the hydrogen gas in vacuum. Subsequently, a nitrogen (N2) gas was introduced into the vessel until its pressure reaches an atmospheric pressure.

The hydrogen-absorbing alloy particle thus argon-treated was taken out and was subjected to oxidation inhibiting agent treatment in which it is immersed for ten days in a solution of disodium hydrogenphosphate (oxidation inhibiting agent) of $1.0 \times 10^{-1}$ by mass % added to the mass of the alloy). The hydrogen-absorbing alloy thus subjected to the oxidation inhibiting agent was referred to as the alloy particle e according to the fifth example.

EXAMPLE 6

The hydrogen-absorbing alloy particle a prepared as described above was subjected to nitrogen gas treatment like the fifth example. The hydrogen-absorbing alloy particle thus prepared was subjected to oxidation inhibiting agent treatment in which it is immersed for ten days in a solution of potassium silicate (oxidation inhibiting agent) of $1.0 \times 10^{-1}$ by mass % added to the mass of the alloy). The hydrogen-absorbing alloy thus subjected to the oxidation inhibiting agent was referred to as the alloy particle f according to the sixth example.

EXAMPLE 7

The hydrogen-absorbing alloy particle z prepared as described above was subjected to nitrogen gas treatment like the fifth example. The hydrogen-absorbing alloy particle thus prepared was subjected to oxidation inhibiting agent treatment in which it is immersed for ten days in a solution of sodium hydrophosphite ($NaH_2PO_4.H_2O$: oxidation inhibiting agent) of $1.0 \times 10^{-1}$ by mass % added to the mass of the alloy). The hydrogen-absorbing alloy thus subjected to the oxidation inhibiting agent was referred to as the alloy particle g according to the seventh example.

EXAMPLE 8

The hydrogen-absorbing alloy particle z prepared as described above was subjected to nitrogen gas treatment like the fifth example. The hydrogen-absorbing alloy particle thus prepared was subjected to oxidation inhibiting agent treatment in which it is immersed for ten days in a solution of tetrahydro sodium borate($NaBH_4$: oxidation inhibiting agent) of $1.0 \times 10^{-1}$ by mass % added to the mass of the alloy). The hydrogen-absorbing alloy thus subjected to the oxidation inhibiting agent was referred to as the alloy particle h according to the eighth example.

EXAMPLE 9

Like the first example, the hydrogen-absorbing alloy particle a prepared as described above was subjected to the hydrogen gas reduction treatment and exhaustion of the hydrogen gas in vacuum. Subsequently, a carbon dioxide ($CO_2$) gas was introduced into the vessel until its pressure reaches an atmospheric pressure. The hydrogen-absorbing alloy particle thus $CO_2$-treated was taken out and was subjected to oxidation inhibiting agent treatment in which it is immersed for ten days in a solution of disodium hydrogenphosphate (oxidation inhibiting agent) of $1.0 \times 10^{-1}$ by mass % added to the mass of the alloy). The hydrogen-absorbing alloy thus subjected to the oxidation inhibiting agent was referred to as the alloy particle i according to the ninth example.

EXAMPLE 10

The hydrogen-absorbing alloy particle z prepared as described above was subjected to nitrogen gas treatment like the ninth example. The hydrogen-absorbing alloy particle thus prepared was subjected to oxidation inhibiting agent treatment in which it is immersed for ten days in a solution of potassium silicate (oxidation inhibiting agent) of $1.0 \times 10^{-1}$ by mass % added to the mass of the alloy). The hydrogen-absorbing alloy thus subjected to the oxidation inhibiting agent was referred to as the alloy particle j according to the tenth example.

EXAMPLE 11

The hydrogen-absorbing alloy particle z prepared as described above was subjected to nitrogen gas treatment like the ninth example. The hydrogen-absorbing alloy particle thus prepared was subjected to oxidation inhibiting agent treatment in which it is immersed for ten days in a solution of sodium hydrophophite (oxidation inhibiting agent) of $1.0 \times 10^{-1}$ by mass % added to the mass of the alloy). The hydrogen-absorbing alloy thus subjected to the oxidation inhibiting agent was referred to as the alloy particle k according to the eleventh example.

EXAMPLE 12

The hydrogen-absorbing alloy particle z prepared as described above was subjected to the carbon dioxide treatment like the ninth example. The hydrogen-absorbing alloy particle thus $CO_2$-treated was subjected to oxidation inhibiting agent treatment in which it is immersed for ten days in a solution of tetrahydro sodium borate (oxidation inhibiting agent) of $1.0 \times 10^{-1}$ by mass % added to the mass of the alloy). The hydrogen-absorbing alloy thus subjected to the oxidation inhibiting agent was referred to as the alloy particle l according to the twelfth example.

Comparative Example 1

The hydrogen-absorbing alloy particle z prepared as described above was subjected to the hydrogen gas reduction treatment like the first example. Upon completion of the hydrogen reduction treatment, exhaustion of the hydrogen is started (air exhaustion is started at 300° C.). The vessel interior was naturally cooled to room temperature while the hydrogen gas is exhausted. Thereafter, the hydrogen-absorbing alloy particle thus prepared was taken out. It was referred to as the alloy particle w according to the first comparative example.

Comparative Example 2

The hydrogen-absorbing alloy particle z prepared as described above was subjected to the hydrogen gas reduction treatment and argon gas treatment like the first example. It was referred to as the alloy particle x according to the second comparative example.

Comparative Example 3

The hydrogen-absorbing alloy particle z prepared as described above was subjected to the hydrogen gas reduction treatment and argon gas treatment like the first example. Thereafter, the hydrogen-absorbing alloy particle thus prepared was immersed in ten days in a water solution (ion-exchange) with no oxidation suppressing agent added. It was referred to as the alloy particle y according to the third comparative example.

Comparative Example 4

The hydrogen-absorbing alloy particle z prepared as described above as it is was referred to as the alloy particle according to the for the comparative example.

2. Making an Electrode for a Testing Cell

Using the alloy particles a~l according to the first to eleventh examples and alloy particles w~z according to the first to fourth comparative examples, polytetrafluoroethylene (PTFE) of 0.1 g serving as a binding agent was mixed with each of these alloy particles of 0.5 g. The mixed material is filled into a nickel-foam porous body and molded under pressure of 1.2 ton/cm$^2$. Thus, hydrogen-absorbing alloy electrodes A~L and W~Z each having a diameter of 20 mm were manufactured.

In this case, the hydrogen-absorbing alloy electrode A was manufactured using the hydrogen-absorbing alloy particle a. Likewise, the hydrogen-absorbing alloy electrodes B, C, D, E, F, G, H, I, J, K and L were manufactured using hydrogen-absorbing alloy particles b, c, d, e, f, g, h, i, j, k and l. The hydrogen-absorbing alloy electrodes W, X, Y and Z were manufactured using the hydrogen-absorbing alloy particles w, x, y and z.

3. Assembling a Testing Cell

Now referring to FIG. 1, an explanation will be given of an example of an assembled test cell using as an negative electrode each of the hydrogen-absorbing alloy electrodes A~L and W~Z. In the testing cell 10 shown in FIG. 1, a cylindrical sealing polypropylene vessel 4 includes a negative electrode 1 of the hydrogen-absorbing alloy electrode, a positive electrode 2 of a cylindrical sintered nickel electrode and a reference electrode 3 of a plate-like sintered nickel electrode which are suspended from an upper cover of the sealing vessel 4. The upper cover 5 is equipped with a pressure meter 7 and a relief valve 8. The vessel 4 is filled with a solution of potassium hydroxide of 30% by mass.

The positive electrode 2 has electrochemical capacity which is much larger than that of the negative electrode 1 of the hydrogen-absorbing alloy electrode and is supported by the one end of a positive lead 2a which penetrates through the upper cover 5. The negative electrode 1 is supported by the one end of a negative lead 1a which penetrates through the upper cover 5 so that it is vertically located at a central position within the cylinder of the positive electrode 2. The other ends of the positive lead 2a and negative lead 1a are connected to a positive terminal 2b and a negative terminal 1b above the upper cover 5, respectively. The relief tube 6 is provided to prevent the internal pressure of the vessel 4 from exceeding a prescribed pressure so that the internal pressure of the vessel 4 is kept constant by adjusting the relief valve 8.

4. Measurement of the Initial Discharging Capacity of the Testing Cell

The testing cell 10 thus structured with the negative electrode of the hydrogen-absorbing alloy electrodes A~L and W~Z was subjected to a charging/discharging cycle in which the charging is continued for 16 hours with a charging current of 100 mA/g at room temperature, and stopped for 1 hour, and the discharging is continued with a discharging current of 200 mA/g until the discharging stopping voltage becomes 0.9 V and stopped for 1 hour. The results of the initial discharging capacity (mAh/g) are shown in Table 1.

5. Making an Electrode for an Alkaline Electrode

Next, using these alloy particles a~l according to the first to twelfth examples and alloy particles w~z according to the first to fourth comparative examples, 100 mass part of the alloy particle and 200 mass of a polyethylene oxide (PEO) solution of 5% by mass serving as a binding agent are mixed to prepare paste. The paste thus prepared is applied to both surfaces of a core body of punching metal plated with nickel and dried at room temperature. Thereafter, it was cut in a prescribed size to manufacture hydrogen-absorbing alloy electrode A~L, and W~Z.

In this case, the hydrogen-absorbing alloy electrode A was manufactured using the hydrogen-absorbing alloy particle a. Likewise, the hydrogen-absorbing alloy electrodes B, C, D, E, F, G, H, I, J, K and L were manufactured using hydrogen-absorbing alloy particles b, c, d, e, f, g, h, i, j, k and l. The hydrogen-absorbing alloy electrodes W, X, Y and Z were manufactured using the hydrogen-absorbing alloy particles w, x, y and z.

6. Assembling an Alkaline Battery

Figure 2:
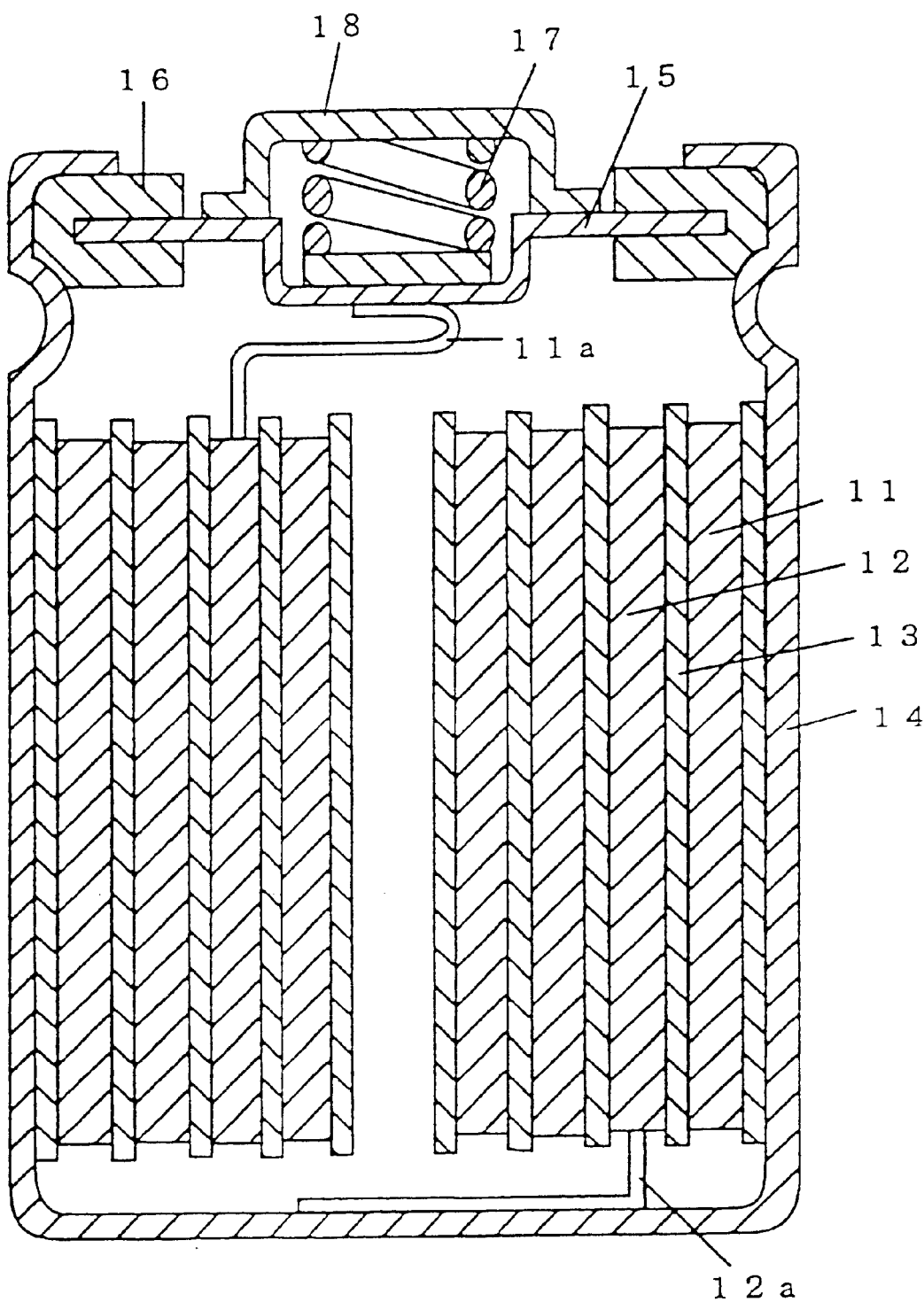
FIG. 2 is a sectional view of an alkaline battery manufactured using the hydrogen-absorbing alloy according to this invention.

Now referring to FIG. 2, an explanation will be given of an example of an positive-polarity controlling type alkaline battery (battery capacity of 1200 mAh) having an AA size which was manufactured using as the negative electrode the above hydrogen-absorbing alloy electrode A~L and W~Z. In the alkaline battery 20 shown in FIG. 2, a positive electrode 11 and a negative electrode 12 wound with a separator interposed therebetween are housed in a negative electrode case 14.

The positive electrode is connected to a sealing cover 15 through a positive lead 11a while the negative electrode 12 is connected to the negative electrode case 14 through a negative lead 12a. The negative case 14 is filled with an electrolyte. A packing 16 is provided at the connecting portion between the negative case 14 and the sealing cover 15. The battery is sealed by the packing 16. A positive electrode external terminal 18 is coupled with the upper portion of the upper cover 15 through a coil spring 17. When the internal pressure of the battery increases abnormally, the coil spring 17 is compressed so that the gas within the battery is discharged in the air. The positive electrode 11 is made of a known sintered nickel electrode, the separator 13 is made of a alkali-resistant non-woven cloth and the electrolyte is the potassium hydroxide of 30% by mass.

7. Measurement of the Initial Discharging Capacity of the Alkaline Battery

Regarding each of the alkaline batteries with the hydrogen-absorbing alloy electrodes A~L and W~Z used as the negative electrode, it was subjected to a repetitive charging/discharging cycle in which it is charged with a charging current of 1.0 C. (1200 mA) at room temperature until a reduction (−Δ) in the battery voltage after the positive electrode has been completed charged reaches 10 mV, and thereafter discharged with a discharging current of 1.0 C. (1200 mA). The number of cycles (cycle life characteristic) taken until the battery capacity reaches 600 mAh (50% of the initial discharging capacity) for each battery is shown in Table 1.

TABLE 1

| Kind of Electrode | Alloy Particle | Timing of exhaustion of H gas after reduction | Introduced gas | Treatment by oxidation inhibiting agent | Initial discha. capaci. (mAh/g) | Cycle life (number of times) |
| --- | --- | --- | --- | --- | --- | --- |
| A | a | after cooled to chaging. temp | Ar | $Na_2HPO_4$ | 314 | 675 |
| B | b | after cooled to chaging. temp | Ar | $K_2O.SiO_2$ | 313 | 674 |
| C | c | after cooled to chaging. temp | Ar | $NaH_2PO_4.H_2O$ | 314 | 674 |
| D | d | after cooled to | Ar | $NaBH_4$ | 315 | 675 |

TABLE 1-continued

| Kind of Electrode | Alloy Particle | Timing of exhaustion of H gas after reduction | Introduced gas | Treatment by oxidation inhibiting agent | Initial discha. capaci. (mAh/g) | Cycle life (number of times) |
|---|---|---|---|---|---|---|
| E | e | after cooled to chaging. temp | $N_2$ | $Na_2HPO_4$ | 317 | 679 |
| F | f | after cooled to chaging. temp | $N_2$ | $K_2O.SiO_2$ | 318 | 678 |
| G | g | after cooled to chaging. temp | $N_2$ | $NaH_2PO_4.H_2O$ | 319 | 679 |
| H | h | after cooled to chaging. temp | $N_2$ | $NaBH_4$ | 318 | 679 |
| I | I | after cooled to chaging. temp | $CO_2$ | $Na_2HPO_4$ | 320 | 681 |
| J | j | after cooled to chaging. temp | $CO_2$ | $K_2O.SiO_2$ | 319 | 680 |
| K | k | after cooled to chaging. temp | $CO_2$ | $NaH_2PO_4.H_2O$ | 319 | 682 |
| L | l | after cooled to chaging. temp | $CO_2$ | $NaBH_4$ | 319 | 681 |
| W | w | no cooling (exhaustion at 300° C.) | Ar | none | 285 | 628 |
| X | x | after cooled to charging. temp | Ar | none | 290 | 620 |
| Y | y | after cooled to charging. temp | Ar | none (ion exchange) | 281 | 613 |
| Z | z | no reduction | none | none | 222 | 620 |

As seen from the result shown in Table 1, the batteries using the hydrogen-absorbing alloy electrodes A~L with the hydrogen-absorbing alloy particles a~l according to the first to twelfth examples have more improved initial discharging capacities and cycle life characteristics as compared with the batteries using the hydrogen-absorbing alloy electrodes W~Z with the hydrogen-absorbing alloy particles w~z according to the first to fourth comparative examples.

The reason why the initial discharging characteristic and cycle life characteristics of the hydrogen-absorbing alloy electrodes A~L have improved can be interpreted as follows.

Specifically, first, when the equilibrium hydrogen pressure of the hydrogen-absorbing alloy has become equal to the hydrogen pressure in the hydrogen gas atmosphere, the hydrogen-absorbing alloy charges hydrogen. However, if evacuation is started at this time to exhaust the hydrogen gas, the hydrogen pressure in the hydrogen gas atmosphere falls so that the charged hydrogen is discharged. Therefore, charging and discharging of the hydrogen are done the instant the evacuation of the atmosphere is started. As a result, minute cracks are formed on the surface of the hydrogen-absorbing alloy particle so that the surface area of the hydrogen-absorbing alloy particle is increased.

Thereafter, at room temperature, when the gas such as Ar, $N_2$, CO, etc. is introduced into the hydrogen-absorbing alloy particle which was activated by the reduction by the hydrogen gas and on the surface of which minute cracks were formed during the exhaustion of the hydrogen gas, the gas such as Ar, $N_2$, CO, etc. is adsorbed on the surface of the hydrogen-absorbing alloy particle so that creation of oxide and/or hydroxide on the surface of the alloy particle is suppressed. Thereafter, when the alloy particle is further immersed for the solution containing the oxidation suppressing agent, the oxidation suppressing agent is selectively adsorbed on the surface of the hydrogen-absorbing alloy particle so that the creation of the oxide and hydroxide is suppressed. As a result, the activity of the surface is maintained. Seemingly, this led to the improvement of the initial discharging capacity and cycle life.

From the above, it can be seen that in order to improve the initial discharging capacity and cycle life of the hydrogen-absorbing alloy particle, it is required that after the atmosphere within the vessel is naturally cooled to the temperature where the equilibrium hydrogen pressure of the hydrogen-absorbing alloy and that of the hydrogen gas atmosphere becomes equal to each other, evacuation of the hydrogen atmosphere is started so that the hydrogen gas is exhausted while the atmosphere is cooled to room temperature, subsequently, the gas such Ar, $N_2$, $CO_2$, etc. is introduced into the atmosphere at room temperature, and the hydrogen-absorbing alloy particle is immersed in a solution containing the oxidation suppressing agent such as disodium hydrogenphosphate, potassium silicate, sodium hydrophophite, tetrahydro sodium borate, etc.

The gas to be introduced may be argon (Ar) as in the hydrogen-absorbing alloy particle a~d. However, nitrogen (N2) (as in the hydrogen-absorbing alloy particle e~h), or carbon dioxide ($CO_2$) (as in the hydrogen-absorbing alloy particle i~l) having greater force adsorbed to the hydrogen-absorbing alloy particle can improve more greatly the initial discharging capacity and cycle life because they have greater surface protective force. As regards the oxidation inhibiting agent, any one of disodium hydrogenphosphate, potassium silicate and sodium hydrophophite, tetrahydro sodium borate can be preferably used because all of them provide approximately equal initial discharging capacities and cycle lives.

8. Investigation of the Adding Amount of the Oxidation Inhibiting Agent

The adding amount of the oxidation inhibiting agent was investigated. The hydrogen-absorbing alloy particle z obtained as described above was subjected to the following hydrogen gas reduction treatment. Specifically, the heat-resistant and pressure-resistant vessel of stainless steel was filled with this hydrogen-absorbing alloy particle. The atmosphere within the vessel was heated to 300° C. while it was evacuated to $1.33 \times 10^{-2}$ Pa($10^{-4}$ Torr) or lower. H2 gas at 0.2 Mpa (2 atm) was introduced into the vessel maintained at 300° C. and held for 0.5 hour as it is.

The atmosphere within the vessel was naturally cooled at a temperature where the hydrogen-absorbing alloy start to charge the hydrogen, i.e. the equilibrium hydrogen pressure of the hydrogen-absorbing alloy and that of the hydrogen gas atmosphere becomes equal to each other. Thereafter, a vacuum pump is operated to evacuate the atmosphere until the interior of vessel is place at $1.33 \times 10^{-2}$ Pa($10^{-4}$ Torr) or lower so that the hydrogen gas within the vessel is exhausted while the atmosphere within the vessel is cooled to room temperature (25° C.). Subsequently, a nitrogen (N2) gas was introduced into the vessel until its pressure reaches an atmospheric pressure. The hydrogen-absorbing alloy particle thus nitrogen-treated was taken out and was subjected to oxidation inhibiting agent treatment in which it is immersed for ten days in a solution of disodium hydrogenphosphate (oxidation inhibiting agent) of $1.0 \times 10^{-7}$ by mass %, $1.0 \times 10^{-6}$ by mass %, $1.0 \times 10^{-5}$ by mass %, $1.0 \times 10^{-4}$ by mass %, $1.0 \times 10^{-3}$ by mass %, $1.0 \times 10^{-2}$ by mass $1.0 \times 10^{-1}$ by mass % (alloy e), $5.0 \times 10^{-1}$ by mass % and $10.0 \times 10^{-1}$ by mass % added to the mass of the alloy), respectively. The hydrogen-absorbing alloys thus subjected to the oxidation inhibiting agent were referred to as the alloy particles m, n, o, p, q, r, s and t.

Using these hydrogen-absorbing alloy particles m, n, o, p, q, r, s and t, in a manner described previously, the electrodes M, N, O, P, Q, R, S, T for the testing cell and the electrodes M, N, O, P, Q, R, S, T for the alkaline electrode were manufactured. Using these electrodes for the testing cell and for alkaline battery, in a manner described previously, the testing cells and the alkaline batteries were manufactured. The initial discharging capacity of each of the testing cells and the cycle life of each of the batteries was acquired in the manner described previously. The result thereof is shown in Table 2. Incidentally, the result regarding the electrode E with the hydrogen-absorbing alloy particle e is also shown in Table 2.

TABLE 2

| Kind of Electrode | Kind of Alloy | Treatment by Oxidation Inhibiting Agent | Adding Amount (mass %) | Initial Discharging Capacity (mAh/g) | Cycle Life (number of times) |
|---|---|---|---|---|---|
| M | m | Na$_2$HPO$_4$ | $1.0 \times 10^{-7}$ | 300 | 640 |
| N | n | Na$_2$HPO$_4$ | $1.0 \times 10^{-6}$ | 313 | 670 |
| O | o | Na$_2$HPO$_4$ | $1.0 \times 10^{-5}$ | 314 | 675 |
| P | p | Na$_2$HPO$_4$ | $1.0 \times 10^{-4}$ | 315 | 677 |
| Q | q | Na$_2$HPO$_4$ | $1.0 \times 10^{-3}$ | 316 | 677 |
| R | r | Na$_2$HPO$_4$ | $1.0 \times 10^{-2}$ | 317 | 678 |
| E | e | Na$_2$HPO$_4$ | $1.0 \times 10^{-1}$ | 317 | 679 |
| S | s | Na$_2$HPO$_4$ | $5.0 \times 10^{-1}$ | 315 | 677 |
| T | I | Na$_2$HPO$_4$ | $10.0 \times 10^{-7}$ | 301 | 641 |

As seen from Table 2, when the hydrogen-absorbing alloy particle subjected to the hydrogen reduction treatment is immersed in the solution of disodium hydrogenphosphate (oxidation inhibiting agent) of $1.0 \times 10^{-6}$ by mass % ~$5.0 \times 10^{-1}$ by mass % (alloy e) added to the mass of the alloy, the initial discharging capacity and cycle life characteristic can be improved. This is because the adding amount of disodium hydrogenphosphate (oxidation inhibiting agent) less than $1.0 \times 10^{-6}$ by mass % cannot sufficiently show the effect of the treatment by the oxidation inhibiting agent whereas the adding amount thereof more than $5.0 \times 10^{-1}$ by mass % has a detrimental effect on these characteristics.

Additionally, when the adding amount of each of potassium silicate, sodium hydrophophite and tetrahydro sodium borate is changed like disodium hydrogenphosphate, substantially the same result has been obtained. Thus, it can be concluded that the adding amount of the oxidation inhibiting agent such as disodium hydrogenphosphate, potassium silicate, sodium hydrophophiteand tetrahydro sodium borate is preferably $1.0 \times 10^{-6}$ by mass % ~$5.0 \times 10^{-1}$ by mass % to the mass of the alloy.

As described above, in accordance with this invention, after the hydrogen-absorbing alloy particle is subjected to the hydrogen reduction treatment so that the surface of the alloy particle is activated, it is naturally cooled at a temperature where the equilibrium hydrogen pressure of the hydrogen-absorbing alloy and that of the hydrogen gas atmosphere becomes equal to each other. Thereafter, evacuation of the atmosphere of the hydrogen gas is started so that the hydrogen gas is exhausted while it is cooled to room temperature. Further, the hydrogen-absorbing alloy particle, after it has been treated by gas of Ar, N2, CO at room temperature, is immersed in the solution of the oxidation inhibiting agent treatment in which it is immersed in the solution of disodium hydrogenphosphate, potassium silicate, sodium hydrophophite and tetrahydro sodium borate. Thus, minute cracks are formed on the surface of the hydrogen-absorbing alloy particle so that the surface area of the hydrogen-absorbing alloy particle is increased and the surface of the alloy particle is not directly touched with the air. Therefore, even if the hydrogen-absorbing alloy particle is exposed to the air, it will not be oxidized again, thereby maintaining the activity.

Accordingly, the hydrogen-absorbing alloy electrode which is excellent in the initial discharging capacity and the cycle life characteristic can be obtained.

An explanation will be given of a second embodiment of this invention in which the hydrogen-absorbing alloy electrode according to this invention is applied to a nickel-metal hydride battery.

1. Creation of Hydrogen-absorbing Alloy Particle (1) Preparation of the Hydrogen-absorbing Alloy Particle The elements of Mm (mischmetal), Ni (purity of 99.9%), Co, Al and Mn which are commercially available are mixed at a mol rate of 1.0:3.1:0.9:0.4:0.6. Thereafter, these elements were cast and dissolved in a high frequency melting furnace, and cooled on a water-cooled copper roll to prepare an ingot of a hydrogen-absorbing alloy having a composition represented by a composition formulas of MmNi$_{3.1}$Co$_{0.9}$Al$_{0.4}$Mn$_{0.6}$. After the ingot of this hydrogen-absorbing alloy has been heat-treated, it was cast into a ball mill so that it was crushed to provide the crushed alloy particle having an average particle diameter of 80 μm or 40 μm. The crushed alloy particle having the average particle diameter of 80 μm is referred to as alloy particle ① and the crushed alloy particle having the average particle diameter of 40 μm is referred to as alloy particle ②.

(2). Surface-treatment of the Gydrogen-absorbing Alloy Particle a. EXAMPLE 1

A heat-resistant pressure resistant vessel of stainless steel is filled with the hydrogen-absorbing alloy particle ① thus prepared, and its interior is heated to 300° C. while it is evacuated to 1.33×10-2 Pa(10-4 Torr) or less. The hydrogen-absorbing alloy particle z is subjected to a hydrogen gas reduction treatment in which a hydrogen gas at 0.2 MPa (2 atm) is introduced into the vessel maintained at 300° C. and maintained for 0.5 hour as it is. Thus, oxide or hydroxide of Ni (nickel) which resides on the surface of the hydrogen-absorbing alloy particle ① was reduced so that the active surface of Ni is exposed to the surface of the hydrogen-absorbing alloy particle.

Thereafter, the atmosphere is vacuum-evacuated until the atmosphere within the vessel maintained at 300° C. is placed at $1.33 \times 10^{-2}$ Pa($10^{-4}$ Torr) or lower so that the hydrogen gas within the vessel is exhausted. After the atmosphere within the vessel is cooled to room temperature (25° C.), carbon dioxide (CO$_2$: adsorption gas) was introduced into the vessel until its pressure reaches an atmospheric pressure. Thus, the carbon dioxide will be adsorbed on the particle surface of the hydrogen-absorbing alloy.

The hydrogen-absorbing alloy particle thus treated with the adsorption gas was taken out. The alloy particle thus obtained is referred to as the alloy particle a according to the first example.

b. EXAMPLE 2

After the hydrogen gas reduction has been performed like the first example, the atmosphere is vacuum-evacuated until the atmosphere within the vessel maintained at 300° C. is placed at $1.33 \times 10^{-2}$ Pa($10^{-4}$ Torr) or lower so that the hydrogen gas within the vessel is exhausted. After the atmosphere within the vessel is cooled to room temperature (25° C.), nitrogen ($N_2$: adsorption gas) was introduced into the vessel until its pressure reaches an atmospheric pressure. The hydrogen-absorbing alloy particle thus treated with the adsorption gas was taken out. The alloy particle thus obtained is referred to as the alloy particle b according to the second example.

c. Comparative Example 1

The hydrogen-absorbing alloy particle ① prepared as described above was subjected to the hydrogen gas reduction in the manner as described above. The hydrogen-absorbing alloy particle thus surface-treatment was taken out form the vessel and was referred to as the alloy particle w according to the first comparative example.

(3) Treatment of the Hydrogen-absorbing Alloy Particle by the Oxidation Inhibiting Agent d. EXAMPLE 3

After the hydrogen-absorbing alloy particle ② prepared as described above is subjected to the hydrogen gas reduction in the manner described above, the atmosphere is vacuum-evacuated until the atmosphere within the vessel maintained at 300° C. is placed at $1.33 \times 10^{-2}$ Pa($10^{-4}$ Torr) or lower so that the hydrogen gas within the vessel was exhausted and the atmosphere within the vessel was cooled to room temperature (25° C.). Next, argon (Ar) was introduced into the vessel until the atmosphere within the vessel is restored to an atmospheric pressure. The hydrogen-absorbing alloy particle was taken out from the vessel. The alloy particle was subjected to oxidation inhibiting agent treatment in which it is immersed for ten days in a solution of disodium hydrogenphosphate ($Na_2HPO_4$: oxidation inhibiting agent) of $1.0 \times 10^{-1}$ by mass % added to the mass of the alloy). The hydrogen-absorbing alloy thus subjected to the oxidation inhibiting agent was referred to as the alloy particle c according to the third example.

e. EXAMPLE 4

After the hydrogen reduction treatment has been executed in the same manner as described above, the atmosphere was vacuum-evacuated and the atmosphere within the vessel was cooled to room temperature (25° C.). Next, argon (Ar) was introduced into the vessel until the atmosphere within the vessel is restored to an atmospheric pressure. The hydrogen-absorbing alloy particle was taken out from the vessel. The alloy particle was subjected to oxidation inhibiting agent treatment in which it is immersed for ten days in a solution of potassium silicate ($K_2O.SiO_2$ oxidation inhibiting agent) of $1.0 \times 10^{-1}$ by mass % added to the mass of the alloy). The hydrogen-absorbing alloy thus subjected to the oxidation inhibiting agent was referred to as the alloy particle d according to the fourth example.

f. EXAMPLE 5

After the hydrogen gas reduction has been executed in the manner described above, the atmosphere is vacuum-evacuated and the atmosphere within the vessel was cooled to room temperature (25° C.). Next, argon (Ar) was introduced into the vessel until the atmosphere within the vessel is restored to an atmospheric pressure. The hydrogen-absorbing alloy particle was taken out from the vessel. The alloy particle was subjected to oxidation inhibiting agent treatment in which it is immersed for ten days in a solution of sodium hydrophophite ($NaH_2PO_4.H_2O$: oxidation inhibiting agent) of $1.0 \times 10^{-1}$ by mass % added to the mass of the alloy). The hydrogen-absorbing alloy thus subjected to the oxidation inhibiting agent was referred to as the alloy particle e according to the fifth example.

g. EXAMPLE 6

After the hydrogen gas reduction has been executed in the manner described above, the atmosphere was vacuum-evacuated and the atmosphere within the vessel was cooled to room temperature (25° C.). Next, argon (Ar) was introduced into the vessel until the atmosphere within the vessel is restored to an atmospheric pressure. The hydrogen-absorbing alloy particle was taken out from the vessel. The alloy particle was subjected to oxidation inhibiting agent treatment in which it is immersed for ten days in a solution of tetrahydro sodium borate($NaBH_4$: oxidation inhibiting agent) of $1.0 \times 10^{-1}$ by mass % added to the mass of the alloy). The hydrogen-absorbing alloy-thus subjected to the oxidation inhibiting agent was referred to as the alloy particle f according to the sixth example.

h. Comparative Example 2

The hydrogen-absorbing alloy particle ② prepared as described above was immersed for ten days in a solution with no oxidation inhibiting agent. The hydrogen-absorbing alloy thus prepared was referred to as the alloy particle x according to the second comparative example.

i. Comparative Example 3

The hydrogen-absorbing alloy particle ② prepared as described above was immersed for ten days in a solution of disodium hydrogenphosphate (oxidation inhibiting agent). The hydrogen-absorbing alloy thus prepared was referred to as the alloy particle y according to the third comparative example.

j. Comparative Example 4

After the hydrogen gas reduction has been executed in the manner described above, the atmosphere was vacuum-evacuated and the atmosphere within the vessel was cooled to room temperature (25° C.). Next, argon (Ar) was introduced into the vessel until the atmosphere within the vessel is restored to an atmospheric pressure. The hydrogen-absorbing alloy particle was taken out from the vessel. The alloy particle was immersed for ten days in a solution with no oxidation inhibiting agent. The hydrogen-absorbing alloy thus prepared was referred to as the alloy particle z according to the fourth comparative example.

4. Measurement of the Initial Discharging Capacity of the Testing Cell

The testing cell 10 thus structured with the negative electrode of the hydrogen-absorbing alloy electrodes A~B and W was subjected to a charging/discharging cycle in which the charging is continued for 16 hours with a charging current of 100 mA/g at room temperature, and stopped for 1 hour, and the discharging is continued with a discharging current of 200 mA/g until the discharging stopping voltage becomes 0.9 V and stopped for 1 hour. The results of the initial discharging capacity (mAh/g) are shown in Table 1. Likewise, using the hydrogen-absorbing alloy electrodes C~F, and X~Z, the measurement results of the initial discharging capacity (mAh/g) is shown in Table 2.

5. Making an Electrode for an Alkaline Electrode

Next, using these alloy particles a~f according to the first to sixth examples and alloy particles w~z according to the first to fourth comparative examples, 100 mass part of the alloy particle and 200 mass of a polyethylene oxide (PEO) solution of 5% by mass serving as a binding agent are mixed to prepare paste. The paste thus prepared is applied to both surfaces of a core body of punching metal plated with nickel and dried at room temperature. Thereafter, it was cut in a prescribed size to manufacture hydrogen-absorbing alloy electrode A~F and W~F.

In this case, the hydrogen-absorbing alloy electrode A was manufactured using the hydrogen-absorbing alloy particle a. Likewise, the hydrogen-absorbing alloy electrodes B, C, D, E and F were manufactured using hydrogen-absorbing alloy particles b, c, d, e and f. The hydrogen-absorbing alloy electrodes W, X, Y and Z were manufactured using the hydrogen-absorbing alloy particles w, x, y and z.

6. Assembling an Alkaline Battery

Now referring to FIG. 2, an explanation will be given of an example of an positive-polarity controlling type alkaline battery (battery capacity of 1200 mAh) having an AA size which was manufactured using as the negative electrode the above hydrogen-absorbing alloy electrode A~F and W~Z. In the alkaline battery 20 shown in FIG. 2, a positive electrode 11 and a negative electrode 12 wound with a separator interposed therebetween are housed in a negative electrode case 14.

TABLE 3

| Kind of Electrode | Alloy Particle | Reduction Treatment by Hydrogen gas | Treatment by Adsorption Gas (Kind) | Initial Discharging capacity (mAh/g) | Cycle Life (number of times) |
|---|---|---|---|---|---|
| A | a | done | $CO_2$ | 307 | 695 |
| B | b | done | $N_2$ | 305 | 678 |
| W | c | done | none | 285 | 628 |

As apparent from the result of Table 3, the hydrogen-absorbing alloy electrodes A and B subjected to the adsorption gas treatment by $CO_2$ or $N_2$ after the reduction treatment by the hydrogen gas have more improved initial discharging capacities and cycle life characteristics as compared with the hydrogen-absorbing alloy particle W not subjected to the adsorption gas treatment. The reason can be guessed as follows. A protective layer due to the adsorption gas such as by $CO_2$, $N_2$, etc. is formed on the surface of the hydrogen alloy particle which was activated by the reduction treatment by the hydrogen gas so that the creation of the oxide or hydroxide on the alloy particle has been suppressed. When the creation of the oxide or hydroxide has been suppressed, the active surface is maintained and the prepared protective layer is dissolved so that the initial discharging capacity has been improved.

The reason can be also guessed as follows. The active state where the oxide or hydroxide residing on the surface of the hydrogen-absorbing alloy has been reduced into the metallic state is maintained. Therefore, the oxygen density in the hydrogen-absorbing alloy immediately after the battery has been manufactured decreases. The corrosion/oxidation due to the alkaline electrolyte within the battery or the oxidation due to the oxygen generated from the positive electrode is retarded. This contributed to the cycle characteristic.

TABLE 4

| Kind of Electrode | Alloy Particle | Reduction Treatment by Hydrogen Gas | Treatment by Oxidation Inhibiting Agent | Initial Discharging Capacity of Test Cell (mAh/g) | Cycle Life of Battery (number of times) |
|---|---|---|---|---|---|
| C | c | done | $Na_2HPO_4$ | 309 | 697 |
| D | d | done | $K_2O.SiO_2$ | 308 | 695 |
| E | e | done | $NaH_2PO_4.H_2O$ | 308 | 694 |
| F | f | done | $NaBH_4$ | 305 | 690 |
| X | x | none | none | 202 | 616 |
| Y | y | none | $Na_2HPO_4$ | 204 | 618 |
| Z | z | done | None | 280 | 614 |

As seen from the result shown in Table 4, in comparison between the electrode X with the hydrogen-absorbing alloy x (with no both reduction treatment by the hydrogen gas and treatment by the oxidation inhibiting agent) according to the second comparison example and the electrode Y with the hydrogen-absorbing alloy y (with only the treatment by the oxidation inhibiting agent), they do not has so large a difference in the initial discharging capacity and cycle life characteristic. From this, it can be seen that only the treatment by the oxidation inhibiting agent does not improve the battery characteristic.

In comparison between the electrode X with the hydrogen-absorbing alloy x (with no both reduction treatment by the hydrogen gas and treatment by the oxidation inhibiting agent) according to the second comparison example and the electrode Z with the hydrogen-absorbing alloy z (with only the reduction treatment by the hydrogen), the electrode Z provides more improved initial discharging capacity. This is probably because in the hydrogen-absorbing alloy z subjected to the reduction treatment by the hydrogen, the surface of the alloy particle is activated, thereby improving the initial discharging capacity.

In comparison between the electrode Z with the hydrogen-absorbing alloy z (with only the reduction treatment by the hydrogen gas) according to the fourth comparison example and the electrode C with the hydrogen-absorbing alloy c (with both the reduction treatment by the hydrogen gas and the treatment by the oxidation inhibiting agent), the electrode C provides more improved initial discharging capacity and cycle life characteristic. This is probably because even when the surface of the hydrogen-absorbing alloy particle is activated by the reduction treatment by the hydrogen gas, if the treatment by the oxidation suppressing agent is not executed, the active surface is oxidized again, thereby attenuating the activity. From this, it can be seen that when the hydrogen-absorbing alloy particle activated by the reduction treatment by the hydrogen gas is subjected to the treatment by the oxidation inhibiting agent, creation of the oxide or hydroxide on the surface of the alloy particle is suppressed so that the activity is maintained, thereby improving the initial discharging capacity and the cycle characteristic.

In comparison among the electrode C with the hydrogen-absorbing alloy c according to the third example, the electrode D with the hydrogen-absorbing alloy d according to the fourth example, electrode E with the hydrogen-absorbing alloy e according to the fifth example and electrode with the hydrogen-absorbing alloy f according to the sixth example, they are not so greatly different in the initial discharging capacity and the cycle life characteristic. From this, it can seen that as regards the oxidation inhibiting agent, any one of disodium hydrogenphosphate, potassium silicate and sodium hydrophophite, tetrahydro sodium borate can be preferably used.

8. Investigation of the Adding Amount of the Oxidation Inhibiting Agent

The adding amount of the oxidation inhibiting agent was investigated. The hydrogen-absorbing alloy particle ② prepared as described above was subjected to the following hydrogen gas reduction treatment. Specifically, the heat-resistant and pressure-resistant vessel of stainless steel was filled with this hydrogen-absorbing alloy particle. The atmosphere within the vessel was heated to 300° C. while it was evacuated to $10^{-4}$ Torr or lower. H2 gas at 2 atm was introduced into the vessel maintained at 300° C. and held for 0.5 hour as it is.

Thereafter, the interior of vessel maintained at 300° C. was vacuum-evacuated until $10^{-4}$ Torr or lower so that the hydrogen gas within the vessel was exhausted while the hydrogen-absorbing alloy particle was cooled to room temperature (25° C.).

Subsequently, an argon gas was introduced into the vessel until its pressure is restored to anatmospheric pressure. The hydrogen-absorbing alloy particle thus argon-treated was taken out and was subjected to oxidation inhibiting agent treatment in which it is immersed for ten days in a solution of disodium hydrogenphosphate (oxidation inhibiting agent) of $1.0 \times 10^{-7}$ by mass %, $1.0 \times 10^{-6}$ by mass %, $1.0 \times 10^{-5}$ by mass %, $1.0 \times 10^{-4}$ by mass %, $1.0 \times 10^{-3}$ by mass % (alloy a), $1.0 \times 10^{-2}$ by mass %, and $1.0 \times 10^{-1}$ by mass %, $5.0 \times 10^{-2}$ by mass by mass %, and $10.0 \times 10^{-1}$ by mass % added to the mass of the alloy), respectively. The hydrogen-absorbing alloys thus subjected to the oxidation inhibiting agent were referred to as the alloy particles g, h, i, j, k, l, m and n.

Using these hydrogen-absorbing alloy particles g, h, i, j, k, l, m and n, in a manner described previously, the electrodes G, H, I, J, K, L, M and N for the testing cell and the electrodes G, H, I, J, K, L, M and N for the alkaline electrode were manufactured. Using these electrodes for the testing cell and for alkaline battery, in a manner described previously, the testing cells and the alkaline batteries were manufactured. The initial discharging capacity of each of the testing cells and the cycle life of each of the batteries was acquired in the manner described previously. The result thereof is shown in Table 5. Incidentally, the result regarding the electrode C with the hydrogen-absorbing alloy particle c is also shown in Table 5.

TABLE 5

| Kind of Electrode | Kind of Alloy | Treatment by Oxidation Inhibiting Agent | Adding Amount (mass %) | Initial Discharging Capacity (mAh/g) | Cycle Life (number of times) |
|---|---|---|---|---|---|
| G | G | Na$_2$HPO$_4$ | $1.0 \times 10^{-7}$ | 291 | 630 |
| H | H | Na$_2$HPO$_4$ | $1.0 \times 10^{-6}$ | 300 | 675 |
| I | I | Na$_2$HPO$_4$ | $1.0 \times 10^{-5}$ | 304 | 687 |
| J | J | Na$_2$HPO$_4$ | $1.0 \times 10^{-4}$ | 305 | 694 |
| K | K | Na$_2$HPO$_4$ | $1.0 \times 10^{-3}$ | 308 | 697 |
| L | L | Na$_2$HPO$_4$ | $1.0 \times 10^{-2}$ | 308 | 696 |
| C | C | Na$_2$HPO$_4$ | $1.0 \times 10^{-1}$ | 309 | 697 |
| M | M | Na$_2$HPO$_4$ | $5.0 \times 10^{-1}$ | 307 | 696 |
| N | N | Na$_2$HPO$_4$ | $10.0 \times 10^{-7}$ | 295 | 669 |

As described above, in accordance with this invention, after the hydrogen-absorbing alloy particle is subjected to the hydrogen gas reduction treatment so that the surface of the alloy particle is activated, the adsorption gas such as carbon dioxide or nitrogen is introduced so that it is adsorbed on the surface of the hydrogen-absorbing alloy particle. Thus, a protective layer is formed on the surface of the hydrogen-absorbing alloy particle. Therefore, even if the hydrogen-absorbing alloy particle is exposed to the air, it will not be oxidized again, thereby maintaining its activity.

Further, after the surface of the hydrogen-absorbing alloy particle has been activated, the alloy particle is immersed in the solution containing the oxidation inhibiting agent so that the oxidation inhibiting agent is selectively adsorbed on the activated surface of the hydrogen-absorbing alloy particle, thereby maintaining the activity. Accordingly, the hydrogen-absorbing alloy electrode which is excellent in the initial discharging capacity and the cycle life characteristic can be obtained.

What is claimed is:

1. A method of manufacturing a hydrogen-absorbing alloy electrode including a hydrogen-absorbing alloy that contains at least a rare-earth element and nickel, comprising the steps of:

(a) holding a hydrogen-absorbing alloy particle in an atmosphere of a hydrogen gas maintained at a temperature where absorbing of the hydrogen gas does not substantially occur;

(b) cooling said atmosphere of step (a) from the temperature where absorbing of the hydrogen gas does not substantially occur to a temperature where the equilibrium hydrogen pressure of the hydrogen-absorbing alloy is equal to the hydrogen pressure in the atmosphere of the hydrogen gas and thereafter vacuum-evacuating said atmosphere of the hydrogen gas so that said hydrogen-absorbing alloy particle is cooled to room temperature while the hydrogen gas is exhausted;

(c) exhausting the hydrogen gas of step (a) and cooling said atmosphere to room temperature and thereafter introducing adsorption gas into said atmosphere so that said adsorption gas is adsorbed on the surface of said hydrogen-adsorbing particle; and (d) immersing said hydrogen-absorbing alloy particle prepared in step (c) in a solution containing an oxidation inhibiting agent.

2. A method of manufacturing a hydrogen-absorbing alloy electrode according to claim 1, wherein in step (a) any oxide or hydroxide residing on the surface of a hydrogen-absorbing alloy particle is reduced while the alloy particle is held in an atmosphere of a hydrogen gas.

3. A method of manufacturing a hydrogen-absorbing alloy electrode according to claim 2, wherein said oxidation inhibiting agent is at least one acid selected from the group consisting of phosphate, silicate, hypophosphite and tetrahydro borate.

4. A method of manufacturing a hydrogen-absorbing alloy electrode according to claim 1, wherein the amount of said oxidation inhibiting agent added is $1.0 \times 10^{-6}$ by mass % ~$5.0 \times 10^{-1}$ by mass % to the mass of the alloy.

5. A method of manufacturing a hydrogen-absorbing alloy electrode according to claim 1, further comprising:

vacuum-evacuating the atmosphere prior to introducing hydrogen gas in step (a) so that any oxygen present in the atmosphere is exhausted.

6. A method of manufacturing a hydrogen-absorbing alloy electrode according to claim 1, wherein in step (a) the alloy particle is held in an atmosphere of a hydrogen gas maintained at a temperature where a microstructure of the hydrogen-absorbing alloy is not subjected to influence of annealing heat.

7. A method of manufacturing a hydrogen-absorbing alloy electrode according to claim 1, wherein step (a) is conducted at a temperature 100° C.~500° C.

8. A method of manufacturing a hydrogen-absorbing alloy electrode according to claim 1, wherein step (a) comprises providing a hydrogen gas atmosphere higher than the equilibrium hydrogen pressure of the hydrogen-absorbing alloy.

9. A method of manufacturing a hydrogen-absorbing alloy electrode according to claim 1, wherein a pressure of step (a) is higher than atmospheric pressure and not higher than 1 MPa.

10. A method of manufacturing a hydrogen-absorbing alloy electrode according to claim 1, wherein a pressure of the hydrogen atmosphere in step (a) is set in a range between 0.11 and 0.51 MPa.

11. A method of manufacturing a hydrogen-absorbing alloy electrode including a hydrogen-absorbing alloy which contains at least a rare-earth element and nickel, comprising the steps of:
   (a) holding a hydrogen-absorbing alloy particle in an atmosphere of a hydrogen gas maintained at a temperature where absorbing; of the hydrogen gas does not substantially occur;
   (b) vacuum-evacuating said atmosphere of step (a) to exhaust the hydrogen gas; and
   (c) cooling the atmosphere of step (b) and thereafter introducing an adsorption gas into said atmosphere so that said adsorption gas is adsorbed on the surface of said hydrogen-absorbing alloy particle.

12. A method of manufacturing a hydrogen-absorbing alloy electrode according to claim 11, wherein step (a) reduces any oxide or hydroxide residing on a surface of a hydrogen-absorbing alloy particle while the alloy particle is held in an atmosphere of a hydrogen gas.

13. A method of manufacturing a hydrogen-absorbing alloy electrode according to claim 11, wherein said adsorption gas is at least one gas selected from the group consisting of carbon dioxide and nitrogen.

14. A method of manufacturing a hydrogen-absorbing alloy electrode according to claim 11, wherein in step (a) the alloy particle is held in an atmosphere of a hydrogen gas maintained at a temperature where a microstructure of the hydrogen-absorbing alloy is not subjected to the influence of annealing heat.

15. A method of manufacturing a hydrogen-absorbing alloy electrode according to claim 11, wherein step (a) is conducted at a temperature 100° C.~500° C.

16. A method of manufacturing a hydrogen-absorbing alloy electrode according to claim 11, wherein step (a) comprises providing a hydrogen gas atmosphere higher than the equilibrium hydrogen pressure of the hydrogen-absorbing alloy.

17. A method of manufacturing a hydrogen-absorbing alloy electrode according to claim 11, wherein a pressure of step (a) is higher than atmospheric pressure and not higher than 1 MPa.

18. A method of manufacturing a hydrogen-absorbing alloy electrode according to claim 11, wherein a pressure of the hydrogen atmosphere in step (a) is set in a range between 0.11 and 0.51 MPa.

19. A method of manufacturing a hydrogen-absorbing alloy electrode according to claim 11, further comprising:
   vacuum-evacuating an atmosphere prior to introducing hydrogen gas in step (a) so that any oxygen present in the atmosphere is exhausted.

20. A method of manufacturing a hydrogen-absorbing alloy electrode including a hydrogen-absorbing alloy which contains at least a rare-earth element and nickel, comprising the steps of:
   (a) reducing an oxide or hydroxide residing on a surface of a hydrogen-absorbing alloy particle while the alloy particle is held in an atmosphere of a hydrogen gas maintained at a temperature where absorbing of the hydrogen gas does not substantially occur;
   (b) vacuum-evacuating said atmosphere of the hydrogen gas in step (a) to exhaust the hydrogen gas;
   (c) cooling said atmosphere of step (b) and thereafter introducing adsorption gas into said atmosphere so that said adsorption gas is adsorbed on the surface of said hydrogen-adsorbing particle; and
   (d) immersing said hydrogen-absorbing alloy particle prepared in step (c) in a solution containing an oxidation inhibiting agent.

21. A method of manufacturing a hydrogen-absorbing alloy electrode according to claim 20, wherein said oxidation inhibiting agent is at least one acid selected from the group consisting of phosphate, silicate, hypophosphite and tetrahydro borate.

22. A method of manufacturing a hydrogen-absorbing alloy electrode according to claim 20, wherein said oxidation inhibiting agent is $1.0 \times 10^{-6}$ by mass % ~$5.0 \times 10^{-1}$ by mass % to the mass of the alloy.

23. A method of manufacturing a hydrogen-absorbing alloy electrode according to claim 20, further comprising:
   vacuum-evacuating and exhausting the atmosphere prior to introducing hydrogen gas in step (a) thereby removing any oxygen present in the atmosphere prior to step (a).

* * * * *